United States Patent [19]

Kitahara

[11] Patent Number: 5,272,212
[45] Date of Patent: Dec. 21, 1993

[54] COLORED SPHERICAL FINE PARTICLES, PROCESS FOR PRODUCTION THEREOF AND APPLICATIONS THEREOF

[75] Inventor: Shizuo Kitahara, Kawasaki, Japan
[73] Assignee: Nippon Zeon Co., Ltd., Tokyo, Japan
[21] Appl. No.: 856,975
[22] PCT Filed: Sep. 25, 1991
[86] PCT No.: PCT/JP91/01271
    § 371 Date: May 22, 1992
    § 102(e) Date: May 22, 1992
[87] PCT Pub. No.: WO92/05202
    PCT Pub. Date: Apr. 2, 1992

[30] Foreign Application Priority Data

Sep. 26, 1990 [JP] Japan ................. 2-256300

[51] Int. Cl.$^5$ ............................ C08F 255/00
[52] U.S. Cl. ...................... 525/301; 525/386
[58] Field of Search ..................... 525/301, 386

[56] References Cited

U.S. PATENT DOCUMENTS

| | | | |
|---|---|---|---|
| 4,331,784 | 5/1982 | Ishibashi et al. | 525/301 |
| 4,412,031 | 10/1983 | Kitihara | 524/526 |
| 4,536,545 | 8/1985 | Olener et al. | 525/301 |
| 4,762,892 | 8/1988 | Okano et al. | 525/301 |
| 4,806,581 | 2/1989 | Walker | 525/301 |
| 4,829,102 | 5/1989 | Biale | 524/458 |
| 4,885,320 | 12/1989 | Biale | 524/458 |

Primary Examiner—Paul R. Michl
Assistant Examiner—Edward Cain
Attorney, Agent, or Firm—Sherman and Shalloway

[57] ABSTRACT

The present invention provides colored spherical fine particles comprising fine particles and a coloring agent uniformly dispersed therein.

The colored spherical fine particles of the present invention can be produced by reaction an unsaturated polymer with an aldehyde group- and carboxyl group-containing organic compound in the present of a Lewis acid or a protonic acid to obtain a modified polymer, dissolving or dispersing the modified polymer, together with a coloring agent, in a polymerization monomer, and polymerizing the polymerizable monomer.

The colored spherical fine particles of the present invention can be used as a toner for electrostatic image development, as they are. Further, the dispersion composition obtained by dispersing the colored spherical fine particles of the present invention in a medium, can be used as a heat-sensitive transfer ink or as a back coating agent for heat-sensitive transfer ink ribbon or magnetic recording medium.

16 Claims, No Drawings

COLORED SPHERICAL FINE PARTICLES, PROCESS FOR PRODUCTION THEREOF AND APPLICATIONS THEREOF

TECHNICAL FIELD

The present invention relates to colored spherical fine particles, a process for their production and their applications. More particularly, the present invention relates to colored spherical fine particles comprising fine particles and a coloring agent uniformly dispersed therein, which can be used as or in coatings, inks, toners for developing electrostatic latent images, coloring agents for heat-sensitive transfer ink, etc., static charge-controlling agents, display materials, magnetic recording materials, and so forth, as well as to a process for their production and their applications.

BACKGROUND ART

Coloring agents are generally a powder of white or other color which is insoluble or difficultly soluble in water and organic substances, and fine wide applications as a coloring agent for ink, coating, plastic, etc. or as a functional material wherein the inherent property of coloring agents is utilized.

Coloring agents take the form of fine powder and their affinity to other substances, for example, organic polymers and organic solvents is therefore weak as compared to the cohesive force between the particles of the powder. This makes it very difficult to uniformly mix or disperse a coloring agent under ordinary mixing or dispersing conditions. Further, coloring agents tend to be reagglomerated and it is difficult to obtain a dispersion having long-term stability.

In order to solve the above problem, there were proposed a number of methods for uniformly mixing or dispersing a coloring agent with or in a solid or liquid base material by coating the surface of the coloring agent with a surfactant or a resin, or by treating said surface with a coupling agent, or by using a polymeric dispersing agent in combination.

In these methods, however, the number of process steps are larger, the operations are complicated and the effects are insufficient; thus, no satisfactory results have not yet been obtained.

Toners used for development of developing electrostatic latent images have heretofore been produced by a process which comprises dispersing, by melt-mixing, a coloring agent and other additives (e.g. static charge-controlling agent, offset-preventing agent, lubricant) in a thermoplastic resin, solidifying the dispersion, finely granulating the solid dispersion, followed by classification to obtain a product having desired particle diameters.

In order to improve the above processes for toner production by grinding, there were proposed various processes for toner production by emulsion or suspension polymerization [e.g. Japanese Patent Publication No. 10231/1961, Japanese Patent Application Kokai (Laid-Open) No. 11957/1988, Japanese Patent Application Kokai (Laid-Open) No. 266562/1987, Japanese Patent Application Kokai (Laid-Open) No. 59242/1989].

These processes comprise adding to a polymerizable monomer a coloring substance (e.g. carbon black) and other additives (e.g. dispersing agent) and then conducting emulsion or suspension polymerization to produce a coloring agent-containing toner by one-stage polymerization.

In these processes, however, the coloring agent is not uniformly dispersed in the polymer particles and the toner properties are not satisfactory.

Further, there were investigated a process which uses a grafted carbon black obtained by graft-polymerizing a monomer component in the presence of carbon black (DT Patent No. 3102823), a process which uses a carbon black surface-treated with a polymer having an oxazoline group, an aziridine group or the like [Japanese Patent Application Kokai (Laid-Open) No. 156760/1989], and a process which comprises polymerizing a monomer in the presence of carbon black and a polymer having compatibility with a functional group present on the surface of the carbon black or having a reactive group (e.g. amino group) reactive with said functional group [e.g. Japanese Patent Application Kokai (Laid-Open) No. 50450/1984, Japanese Patent Application Kokai (Laid-Open) No. 67563/1987]. In these processes, however, the type of carbon black used is restricted or the number of the steps is larger making the product quality non-uniform. The process which comprises conducting polymerization in the presence of a polar monomer and additives (e.g. stabilizer such as polyvinyl alcohol or the like), give no sufficient effect and the colored fine particles obtained have a problem in pigment dispersibility.

In recent years, recording in color has made and is still making a rapid progress. Hence, it is actively under way to develop colored fine particles wherein an organic coloring agent, in place of carbon black, is uniformly dispersed in polymer fine particles. Presently, however, there is no technique in which an organic coloring agent, similarly to an inorganic pigment, can be dispersed in a polymerizable monomer; development of a new technique is therefore necessary.

Hence, the objects of the present invention are to provide novel colored spherical fine particles comprising polymer fine particles and a coloring agent uniformly dispersed therein; a process for their production; and their applications.

DISCLOSURE OF THE INVENTION

The present inventors found that the colored spherical fine particle meeting the above objects can be produced by reacting an unsaturated polymer with an aldehyde group- and carboxyl group-containing organic compound in the presence of a Lewis acid or a protonic acid to obtain a modified polymer, dissolving or dispersing the modified polymer, together with a coloring agent, in a polymerizable monomer, and polymerizing the polymerizable monomer.

The colored spherical fine particles of the present invention have a spherical shape with the particle diameters and their distribution being controllable as desired and comprise fine particles and a coloring agent uniformly dispersed therein. Consequently, they have neither color non-uniformity nor unevenness in electric charge amount. Hence, the present colored spherical fine particles can be preferably used as a toner for developing electrostatic latent images development, a coloring agent or modifier for coating or ink, etc.

Also, the present colored spherical fine particles, by compounding into a thermoplastic resin, can form a uniform coating film.

Also, the present colored spherical fine particles, by imparting crosslinkability to them, can be used as an additive (a coloring component) for coating.

Also, the present colored spherical fine particles can be used as a coloring component for thermoplastic or thermosetting resin, etc.

BEST MODE FOR CARRYING OUT THE INVENTION

The feature of the present invention lies in using a particular modified polymer. The constitution of the present invention is described hereinafter.

PROCESS FOR PRODUCTION OF MODIFIED POLYMER

The modified polymer used in the present invention, obtained by reacting a polymer having unsaturated bonds, with an carboxylic group- and aldehyde group-containing organic compound in the presence of a protonic acid or a Lewis acid, is a polymer obtained by the process described in Japanese Patent Publication No. 3802/1990.

The polymer having unsaturated bonds is a polymer having carbon-carbon double bonds in the molecular chain, in the side chains or at the molecular chain terminals.

As the polymer having double bonds in the molecular chain, there can be mentioned, for example, homopolymers and copolymers of conjugated diene (e.g. butadiene, isoprene, piperylene), dicyclopentadiene and ethylidenenorbornene; and conjugated diene-vinyl monomer copolymers, for example, a polybutadiene, a polyisoprene, a styrene-butadiene copolymer [a random copolymer and a block copolymer (an A-B type, an A-B-A type, etc. wherein A refers to a polybutadiene block and B refers to a polystyrene block.)], a styrene-isoprene copolymer [a random copolymer and a block copolymer (an A-B type, an A-B-A type, etc. wherein A refers to a polyisoprene block and B refers to a polystyrene block.)], an acrylonitrile-butadiene copolymer, a butadiene-propylene copolymer, an ethylene-propylene-diene monomer terpolymer and partial hydrogenation products thereof.

As the polymer having double bonds at the molecular chain terminals, there are mentioned, for example, low-molecular polymers and oligomers such as low-molecular polyethylene, polypropylene, α-olefin oligomer and the like; and macromers such as polybutene, poly(ethylene glycol diallylate), poly(propylene glycol diallylate), poly(propylene glycol dimethacrylate), poly(styrene methaeryalte), poly(styrene allylate) and the like.

As exemplified above, the polymer having unsaturated bonds can be any polymer having carbon-carbon double bonds in the molecular chain, in the side chains or at the molecular chain terminals. The polymer has no particular restriction with respect to the molecular weigh, either, and includes from oligomers to high-molecular polymers.

The carboxyl group- and aldehyde group-containing organic compound to be reacted with the above compound has at least one carboxyl group and at least one aldehyde group in the molecule, and is an aldehyde-carboxylic acid selected from aliphatic chain compounds having up-to-20 carbon atoms, compounds having aromatic rings such as benzene ring, naphthalene ring, pyridine ring, furan ring and the like, and compounds having alicyclic rings such as cyclopentane ring, cyclopentene ring, cyclohexane ring and the like. These compounds each may contain, in the molecular chain, oxygen atom(s), sulfur atom(s), nitrogen atom(s) or multiple bond(s), as required. Further, the hydrogen atom(s) in each molecule of the compounds may be replaced by appropriate substituent(s) such as alkyl group, alkoxy group, halogen atom, hydroxyl group, amino group and the like, as long as it does not adversely affect the reaction between the polymer and the compound.

As specific examples of the aliphatic compounds, there are mentioned glyoxylic acid, formylacetic acid, 2-formylacrylic acid, 6-formylhexanoic acid, formylmethoxyacetic acid, 2-formylbutyric acid and 3-(carboxymethoxy)propionaldehyde; as specific examples of the compounds having aromatic rings, there are mentioned 2-, 3- or 4-carboxybenzaldehyde, 2-formyl-5-acetylbenzoic acid, 2-, 3- or 4-formylphenylacetic acid, 1,8-naphthoaldehyde-acid, 3-(2-formylphenyl)propionic acid, 2-, 3-or 4-formylphenoxyacetic acid, 2-formyl-4-methylphenoxy-acetic acid, 6-(2-, 3- or 4-formylphenoxy)hexanoic acid and 2-, 3- or 4-formylphenylthioacetic acid; as specific examples of the compounds having alicyclic rings, there are mentioned 2-formylcyclopentanecarboxylic acid, 4-formyl-2-cyclopentenecarboxylic acid and 2-formylcyclohexanecarboxylic acid.

Of these compounds, particularly preferably are compounds having aromatic rings having thereon carboxyl group(s) or carboxyl group-containing atomic group(s) and aldehyde group(s) or aldehyde group-containing atomic group(s) at the positions adjacent to each other, in view of the reaction rate.

The amount of the carboxyl group- and aldehyde group-containing organic compound used is ordinarily 0.01-20 parts by weight, preferably 0.1-5 pars by weight per 100 parts by weight of the compound having unsaturated bonds.

The catalyst used in the reaction is selected from a protonic acid and a Lewis acid.

As the protonic acid, there are mentioned sulfuric acid, nitric acid, chlorosulfonic acid, p-toluenesulfonic acid, hydrogen halides, etc.

As the Lewis acid, there are used $SnCl_4$, $SbCl_5$, $WCl_5$, $TiCl_4$, $BCl_3$, etc.

The amount of the catalyst used in ordinarily 0.01-5 moles, preferably 0.05-2 moles per mole of the carboxyl group- and aldehyde group-containing organic compound.

The reaction between the unsaturated polymer and the carboxyl group- and aldehyde group-containing organic compound is conducted ordinarily in the presence of a solvent. A particularly suitable solvent is one which is inert to the catalyst and which can dissolve the two compounds. As the solvent, there are mentioned, for example, aromatic solvents such as benzene, toluene and the like; aliphatic solvents such as butane, hexane and the like; and halogenated hydrocarbon solvents such as chloroform, dichloroethane and the like. The reaction is conducted ordinarily at temperatures of 0°-100° C. for 10 seconds to several tens of hours.

Termination of the reaction and coagulation of the reaction product can be conducted simultaneously by adding a large amount of an alcohol or hot water to the reaction system. As necessary, the remaining catalyst is removed by washing. Thus, the modified polymer (a) used in the Present invention can be obtained.

The molecular weight of the modified polymer can be appropriately selected depending upon, for example, the types of the coloring agent and polymerizable monomer both described later, and is not particularly restricted. It is ordinarily in the range of 300–1,000,000 in terms of standard polystyrene-calibrated number-average molecular weight as measured by GPC.

COLORING AGENT

The coloring agent of the present invention is not particularly restricted as long as it is an inorganic or organic powdery substance which is insoluble or difficultly soluble in water or organic solvents and which can achieve the coloring of any desired medium when the colored spherical fine particles of the present invention produced with the coloring agent are added to the medium.

As the inorganic coloring agent, there are mentioned pigments and fillers such as silica, calcium carbonate, alumina, glass, talc, kaolin, bentonite, titanium dioxide, zinc sulfide, zinc white, antimony oxide, aluminum hydroxide, red iron oxide, chromium oxide, nickel, chromium, barium carbonate, iron, copper oxide, tin oxide, carbon black (furnace black, channel black, acetylene black, thermal black, lamp black, etc.) and the like.

As the organic coloring agent, there can be mentioned organic pigments or dyes currently used widely and generally. Typical examples are azo types and condensed azo types (Brilliant Carmine BS, Lake Carmine FB, Brilliant Fast Scarlet, Lake Red 4R, Permanent Red R, Fast Red FGR, Toluidine Maroon, Dis-azo Yellow, Fast Yellow G, Dis-azo Orange, Vulcan Orange, Pyrrazolone Red, etc.), phthalocyanine types (Phthalocyanine Blue, Fast Sky Blue, Phthalocyanine Green, etc.), dyeing lake types (Yellow Lake, Rose Lake, Violet Red Lake, Blue Lake, Green Lake, etc.), oxazine types, quinacridone types and quinaphthalone types.

POLYMERIZABLE MONOMER

As the polymerizable monomer used for obtaining the spherical fine particles of the present invention, there are mentioned styrene type monomers such as styrene, methylstyrene, α-methylstyrene, p-methoxystyrene, tert-butylstyrene, chlorostyrene and the like; acrylic acid type or methacrylic acid type monomers such as methyl acrylate, ethyl acrylate, butyl acrylate, stearyl acrylate, 2-ethylhexyl acrylate, methyl methacrylate, propyl methacrylate, butyl methacrylate, stearyl methacrylate, 2-ethylhexyl methacrylate, dodecyl methacrylate and the like; diene type monomers such as butadiene, isoprene and the like; ethylene; vinyl chloride; acrylonitrile; acrylamide; methaerylamide; vinylpyridine; N-vinylpyrrolidone; N-hydroxylacrylamide; 2-vinyl-oxazoline; 2-isopropenyl-2-oxazoline; vinyl acetate; N-methylolacrylamide; dimethylaminoethyl acrylate; glycidyl methacrylate; allyl glycidyl ether; maleic anhydride; monomethyl fumarate; and so forth.

Together with the polymerizable monomer, at least one appropriate crosslinkable compound can be used. Examples of such a compound are aromatic divinyl compounds such as divinylbenzene, divinylnaphthalene and derivatives thereof and the like; di- or tri-ethylenically unsaturated carboxylic acid esters such as ethylene glycol dimethacrylate, diethylene glycol dimethacrylate, triethylene glycol dimethacrylate, trimethylolpropane triacrylate, 1,3-butanediol dimethacrylate and the like; divinyl compounds such as N,N-divinylaniline, divinyl ether, divinyl sulfide, divinylsulfone and the like; and compounds having three or more vinyl groups. The amount of the crosslinkable compound used is 0.005–20% by weight based on the polymerizable monomer.

PROCESS FOR PRODUCTION OF COLORED SPHERICAL FINE PARTICLES

The colored spherical fine particles of the present invention can be produced by dissolving or dispersing the modified polymer and the coloring agent in the polymerizable monomer and then conducting polymerization. The polymerization process is not particularly restricted as long as it can produce spherical fine particles containing a coloring agent. A particularly preferred polymerization process is suspension polymerization.

The suspension polymerization is ordinarily conducted by dispersing a polymerizable monomer in a medium (mainly water) having no solvency for the monomer and using a polymerization initiator insoluble in the medium but soluble in the monomer.

There is also used 0.01–20% by weight, based on the polymerizable monomer, of a dispersion stabilizer.

Preferable examples of the dispersion stabilizer are water-soluble polymers such as polyvinyl alcohol, starch, methyl cellulose, carboxymethyl cellulose, hydroxyethyl cellulose, poly(sodium methacrylate) and the like. As the dispersion stabilizer, there can also be used, besides the above compounds, barium sulfate, calcium sulfate, aluminum sulfate, calcium carbonate, calcium phosphate, talc, clay, diatomaceous earth, metal oxide powders, etc.

As the polymerization initiator used in the polymerization, there can be used oil-soluble peroxide types or azo type initiators ordinarily used. Examples of these initiators are peroxide type initiators such as benzoyl peroxide, octanoyl peroxide, o-methoxybenzoyl peroxide, methyl ethyl ketone peroxide, cumene hydroperoxide, tert-butylhydroperoxide and the like, 2,2'-azobisisobutyronitrile, 2,2'-azobis(2,4-dimethylvaleronitrile), 2,2'-azobis-2,3-dimethylbutyronitrile, 2,2'-azobis-2,3,3-trimethylbutyronitrile, 2,2'-azobis-2-isopropylbutyronitrile, 4,4-azobis-4-cyanovaleric acid, dimethyl 2,2'-azobisisobutyrate, etc. The polymerization initiator is preferably used in an amount of 0.01–20% by weight, particularly 0.1–10% by weight based on the polymerizable monomer.

In producing the colored fine particles of the present invention by suspension polymerization, at least one modified polymer mentioned above is dissolved in a polymerizable monomer; thereto are added a polymerization initiator and a coloring agent; the mixture is stirred to prepare a suspension; the suspension is added to a medium containing a dispersion stabilizer; and stirring is conducted so that the suspension droplets have particle diameters of desired range. The suspension is then heated to a desired temperature and polymerization is started. After the completion of the polymerization, desired colored spherical fine particles are recovered by an appropriate separation means.

The amount of the coloring agent is appropriately determined depending upon the application purpose of the colored spherical fine particles of the present invention, and has no particular restriction. It is ordinarily 0.1–200 parts by weight per 100 parts by weight of the polymerizable monomer component.

The amount of the present modified polymer used is not particularly restricted, either, but it is ordinarily 1–500 parts by weight, preferably 1–100 parts by weight per 100 parts by weight of the coloring agent although it varies depending upon the type and molecular weight of the modified polymer.

It is possible to add, to the above-mentioned dispersion, various additives (e.g. a static charge-controlling agent and a fluidizing agent when the colored spherical fine particles obtained are used as a toner) in order to endow the colored spherical fine particles with the properties required in each application field. The present modified polymer may be used in a reduced amount or may not be used at all when a coloring agent surface-treated with said polymer is used.

The particle diameters of the present colored spherical fine particles have no particular restriction but are preferably in the range of 0.1-100 μm because with such a range, the fine particles are easy to handle and can express noticeable effects in various applications.

The colored spherical fine particles of the present invention have a spherical shape with the particle diameters and their distribution being controllable as desired and comprise fine particles and a coloring agent uniformly dispersed therein. Consequently, they have neither color non-uniformity nor uneveness in electric charge amount. Hence, the present colored spherical fine particles can be preferably used as a toner for developing electrostatic latent images development, a coloring agent or modifier for coating or ink, etc.

The applications of the present colored spherical fine particles are described hereinafter.

The present colored spherical fine particles can be used as a toner for developing electrostatic latent images development as they are. Further, the dispersion composition comprising colored spherical fine particles, obtained by dispersing said fine particles in a desired medium, can be used as a covering material or in various other applications described later.

The toner for developing electrostatic latent images development, of the present invention can be used in combination with one or more pigments and dyes each as a coloring agent, such as carbon black, aniline black, Crystal Violet, Rhodamine B, Malachite Green, nigrosine, copper phthalocyanine, azo dyes and the like.

The toner may also be used in combination with one or more highly polar substances which are called a static charge-controlling agent in the art, such as nigrosine dyes, monoazo dyes, metal-containing dyes, zinc hexadecylsuccinate, alkyl ester or alkyl amide of naphthoic acid, nitrohumic acid, N,N'-tetramethyldiaminebenzophenone, N,N'-tetramethylbenzidine, triazine, salicyclic acid-metal complexes and the like.

As the usable coloring agent, there can be further mentioned metal oxides such as titanium oxide, silicon dioxide, zinc oxide and the like, as well as magnetic powders of iron, cobalt, nickel, iron sesquioxide, tri-iron tetroxide, manganese iron oxide, zinc iron oxide, nickel iron oxide, etc.

When toner particles of about 2-50 μm in particle diameter are produced using a magnetic powder, it is Preferable to use a magnetic powder of 1 μm of less in particle size.

The amount of the coloring agent used is not particularly restricted. Generally, however, the amount is ordinarily 5-20 parts by weight per 100 parts by weight of the fixing (binding) resin in the case of carbon black used in two-component toner, and is relatively large and 50-300 parts by weight, preferably 90-200 parts by weight in the case of magnetic powder used in magnetic powder-containing toner.

In the present invention, the toner may contain, besides the above-mentioned components, additives for endowing the toner with controlled static charge, electroconductivity, fluidity, or adhesivity to electrophotographic receptor or fixing roll, or may be externally mixed with said additives.

The additives include release agents such as low-molecular weight polyethylene, low-molecular weight polypropylene, various waxes, silicon oil and the like; dyes such as metal-containing dyes, nigrosine type dyes and the like; inorganic fine powders of carbon black, silica, cerium oxide, zinc oxide, etc.; and so forth.

The toner of the present invention has excellent developability and excellent transfer property and can form a high-density image. The toner can further form an image which is uniform and stable over a long period of time, because the electrical properties are uniform and the distribution of electric charge amount is narrow between the toner particles.

In the toner, since the affinity of coloring agent(s) to vinyl type monomer is very good, the energy required for dispersion at the time of toner production can be small.

The dispersion composition comprising colored spherical fine particles, of the present invention can be obtained by dispersing the colored spherical fine particles of the present invention in an appropriate medium such as binder, vehicle or the like. The dispersion composition can be coated on the surface of a film, a tape, a shaped plastic material, a metal or the like in order to endow said material with uniform color, antistatic property, abrasion resistance, lubricity and the like. The dispersion composition can also be used in ink production, etc.

The medium used in the present dispersion composition varies depending upon the application purpose of the composition, but is exemplified by a binder, a binder-solvent mixture, a vehicle, etc.

The typical applications of the dispersion composition of the present invention include, for example, a covering material, a coating, a coating agent for heat-sensitive transfer ink ribbon, a back coating agent for magnetic recording medium, a retouching liquid for correction or erasing of wrong or mistaken word, staining etc., a heat-sensitive transfer ink, a heat-meltable ink for heat-sensitive ink roll, etc. and a printing ink. The applications are not restricted thereto.

When the dispersion composition of the present invention is used as a coating agent for heat-sensitive transfer ink ribbon, the binder used therein is selected from those conventionally used in said application, such as vinyl chloride resin, vinyl chloride-vinyl acetate copolymer, urethane resin, acrylic resin, polyester resin, styrene polymer and the like.

The proportion of the colored spherical fine particles used is not particularly restricted, but is ordinarily 1-40% by weight, preferably 5-20% by weight in said coating.

The coating agent for heat-sensitive transfer ink ribbon is coated, in the form of a dispersion wherein the colored spherical fine particles and the binder are dissolved or dispersed in a solvent capable of dissolving said binder, on a substrate conventionally used for said ink ribbon, of film shape, tape shape or the like made of a polyester, cellulose acetate, a polyvinyl chloride or the like, using a roll coater, an air doctor coater, an air knife coater or the like, whereby a back coat layer is formed.

When the dispersion composition of the present invention is used as a back coating agent for magnetic recording medium, the binder used therein is selected from those conventionally used in said application, such as vinyl chloride resin, vinyl chloride-vinyl acetate copolymer, urethane resin, acrylic resin, polyester resin and the like.

The proportion of the colored spherical fine particles used is not particularly restricted, but is ordinarily 1–40% by weight, preferably 5–20% by weight in said coating.

The back coating agent for magnetic recording medium is coated, in the form of a dispersion wherein the colored spherical fine particles and the binder are dissolved or dispersed in a solvent capable of dissolving said binder, on a film, a tape or the like conventionally used as a substrate for magnetic recording medium and made of a polyester, cellulose acetate, a polyvinyl chloride or the like, using a roll coater, an air doctor coater, an air knife coater or the like, whereby a back coat layer is formed.

When the dispersion composition of the present invention is used for coating, there is selected a binder or a vehicle each ordinarily used in coatings, in view of the adhesion and wettability to or on the substrate to be coated and the properties required for the film to be formed, such as weather resistance, flexibility, chemical resistance and the like. Examples of the binder or vehicle are a vinyl chloride resin, a vinyl chloride-vinylidene chloride copolymer, (meth)acrylic acid ester-styrene copolymer, a vinyl acetate polymer, a cellulose polymer, an urethane resin, a novolac resin, an alkyd resin, an unsaturated polyester resin and a curable acrylic resin.

The proportion of the colored spherical fine particles used is not particularly restricted, but is ordinarily 5–300 parts by weight, preferably 10–200 parts by weight per 100 by weight of the binder or vehicle.

When the dispersion composition of the present invention is used as a heat-meltable ink, there can be used, as the binder, those conventionally used in said application and there is no particular restriction for the binder. Examples of the binder are natural or synthetic waxes such as carnauba wax, montan wax, paraffin wax, microcrystalline wax, oxide wax, low-molecular polyethylene wax, low-molecular weight polypropylene wax and the like, higher fatty acids and their esters and metal salts, such as stearic acid, palmitic acid, aluminum stearate, barium palmitate, lead palmitate, methyl hydroxystearate, glycerol stearate and the like; synthetic resins such as polysulfone ether, polycarbonate, polystyrene, silicon resin, acrylic resin, polyamide resin, petroleum resin, terpene resin, polybutene and the like; and elatomers such as natural rubber, polyisoprene, styrene-butadiene copolymer rubber (random type and block type) and the like.

The heat-meltable ink can be produced by melt-mixing the above binder and the colored spherical fine particles of the present invention using an appropriate mixer. The proportion of the colored spherical fine particles used is not particularly restricted, but is 5–80% by weight, preferably 20–60% part in said ink. As necessary, other additives may be added.

When the dispersion composition of the present invention is used as a printing ink, there can be used, as the vehicle, those conventionally used in said and suitable for the printing technique employed, such as letterpress printing, intaglic printing, lithography or the like, and the vehicle has no particular restriction. Examples of the vehicle include a mineral oil; a solution of a modified rosin, a modified nitrocellulose, an alkyd resin or the like in an alcohol, a low-boiling hydrocarbon solvent or the like; and a varnish such as oil varnish, synthetic resin varnish or the like.

The printing ink can be produced by mixing the above vehicle and the colored spherical fine particles using a known dispersion mixer. Other additives may be used as necessary. The proportion of the colored spherical fine particles is not particularly restricted but is ordinarily 1–300% by weight, preferably 5–100% by weight in the printing ink.

The colored spherical fine particles of the present invention can also be used as a coloring component for thermoplastic or thermosetting resins.

The present invention is hereinafter described in detail by way of Examples. However, the present invention is by no means restricted by the following Examples. In the Examples and Comparative Examples, parts and % are by weight unless otherwise specified.

Incidentally, each molecular weight refers to a standard polystyrene-calibrated number-average molecular weight (Mn) as measured by GPC.

SYNTHESIS EXAMPLE 1

100 g of an oligomer shown in Table 1 was dissolved in 400 ml of toluene. The solution was placed in a vessel equipped with a stirrer, an internal heater, a steam condenser and a liquid-solid inlet. The contents were heated to 30° C. with stirring.

Reagents A and B shown in Table 1 were added each in an amount of 1 mole. A reaction was conducted for about 1 hour.

A small amount of methanol was added the terminate the reaction. Thereafter, 50 ml of water containing sodium carbonate was added, and stirring was conducted. The reaction mixture was allowed to stand. The organic layer was separated and washed with 500 ml of water. After standing, the organic layer was separated and the solvent was removed to obtain a reaction product.

There were thus obtained modified polymers A to C each of the present invention.

TABLE 1

| Test No. | 1 | 2 | 3 |
| --- | --- | --- | --- |
| Polymer having unsaturated bonds | Liquid isoprene (Mn = 4,000) | Styrene-isoprene block copolymer (Mn = 10,000) | Styrene-propylene diene copolymer (Mn = 8,500) |
| Reagent A | 2-Formlphenoxy-acetic acid | 5-Formylpentanoic acid | 1-Formyl-2-naphthyl-oxyacetic acid |
| Reagent B | Tin tetrachloride | Antimony pentachloride | Tin tetrachloride |
| Modified polymer | A | B | C |

SYNTHESIS EXAMPLE 2

100 g of a polymer shown in Table 2 was dissolved in 500 ml of xylene. The solution was placed in a vessel equipped with a stirrer, an internal heater, a steam condenser and a liquid-solid inlet. The contents were heated to 30° C. with stirring.

Reagents A and B shown in Table 2 were added each in an amount of 1 mole, and a reaction was conducted for about 1 hour.

A small amount of methanol was added the terminate the reaction. Then, the mixture was poured into 1,000 ml of methanol for coagulation. The product obtained was dried using a vacuum drier.

After standing and separation, the solvent was removed from the organic layer to obtain a product.

There were thus obtained modified polymers D to E each of the present invention.

pared dispersion comprising 0.5 part of azobisisobutyronitrile. The mixture was stirred for 1 minutes using a homomixer (3,000 rpm), to prepare a suspension.

The suspension was subjected to a polymerization at 80° C. for 6 hours under a nitrogen current to obtain a suspension of polymer particles. The suspension was subjected to a repeated procedure of centrifugation and water washing, followed by vacuum drying to obtain colored spherical fine particles.

The colored spherical fine particles were subjected to measurement using a coulter counter (aperture=100 μm). Further, the powder of said fine particles was observed under an optical microscope to evaluate the dispersion state of inorganic pigment in each fine particle. ⊚ indicates very good dispersion state; ○ indicates good dispersion state; Δ indicates partial agglomeration; and X indicates that agglomeration occurred during polymerization.

TABLE 2

| Test No. | 4 | 5 | 6 |
|---|---|---|---|
| Polymer having unsaturated bonds | Polybutene (Mn = 30,000) | Styrene-isoprene (9/1) random copolymer (Mn = 70,000) | Hydrogenation product of styrene-isoprene block copolymer (Mn = 150,000) Iodine value = 20 |
| Reagent A | 2-Formlphenoxy-propionic acid | 5-Formyloctanoic acid | 1-Formylphenoxyacetic acid |
| Reagent B | Tin tetrachloride | Tungsten hexachloride | Tin tetrachloride |
| Modified polymer | D | E | F |

The results are shown in Table 3.

TABLE 3

| Polymerization recipe and evaluation | | Example | | | | | | Comparative example | | |
|---|---|---|---|---|---|---|---|---|---|---|
| | | 1 | 2 | 3 | 4 | 5 | 6 | 1 | 2 | 3 |
| Polymerizable monomers | Styrene | 100 | 80 | 50 | 80 | 80 | 50 | 50 | 80 | 80 |
| | Butyl acrylate | | 20 | 30 | 20 | 20 | 30 | 30 | 20 | 20 |
| | Acrylonitrile | | | 20 | | | 20 | 20 | | |
| | Divinylbenzene | 0.3 | | | | 0.5 | 0.5 | | 0.5 | |
| Inorganic pigment | Carbon black | 6 | 6 | | | 6 | | 6 | 6 | 6 |
| | Titanium oxide | | | 10 | | | | | | |
| | Red iron oxide | | | | 12 | | 12 | | | |
| Modified polymer | A | 2 | | | | | | | | |
| | B | | 3 | | | | | | | |
| | C | | | 5 | | | | | | |
| | D | | | | 6 | | | | | |
| | E | | | | | 3 | | | | |
| | F | | | | | | 6 | | | |
| | G(1) | | | | | | | 3 | | |
| | H(2) | | | | | | | | 3 | |
| Properties of particles | Particle diameter (μm) | 7.60 | 8.21 | 9.50 | 8.89 | 7.91 | 9.31 | 8.45 | 8.13 | 9.00 |
| | Dispersion state | ⊚ | ⊚ | ⊚ | ⊚ | ○ | ○ | X | Δ | X |

Notes
(1): a styrene-maleic acid (80/20) copolymer
(2): a styrene-vinylpyridine (90/10) copolymer

EXAMPLES 1-6 AND COMPARATIVE EXAMPLES 1-3

Into the same reaction vessel as used in Synthesis Example 1 was fed 997 parts of deionized water containing 3 parts of a polyvinyl alcohol (polymerization degree=500, saponification degree=88%). Thereto were fed a separately prepared dispersion comprising the components shown in Table 3 and a separately pre-

EXAMPLES 7-12 AND COMPARATIVE EXAMPLES 4-6

Colored spherical fine particles were produced using the components shown in Table 4, in the same manner as in Example 1. Evaluation was made in the same manner as in Example 1. The results are shown in Table 4.

TABLE 4

| Polymerization recipe and evaluation | | Example | | | | | | Comparative example | | |
|---|---|---|---|---|---|---|---|---|---|---|
| | | 7 | 8 | 9 | 10 | 11 | 12 | 4 | 5 | 6 |
| Polymerizable monomers | Styrene | 100 | 80 | 50 | 80 | 80 | 50 | 80 | 50 | 80 |
| | Butyl acrylate | | 20 | 30 | 20 | 20 | 30 | 20 | 30 | 20 |
| | Acrylonitrile | | | 20 | | | 20 | | 20 | |
| | Divinylbenzene | 0.3 | | | | 0.5 | 0.5 | | | 0.5 |

TABLE 4-continued

| Polymerization recipe and evaluation | | Example | | | | | | Comparative example | | |
|---|---|---|---|---|---|---|---|---|---|---|
| | | 7 | 8 | 9 | 10 | 11 | 12 | 4 | 5 | 6 |
| Inorganic pigment | Phthalocyanine Blue | 15 | 15 | | | 15 | | 15 | 15 | 15 |
| | Lake Red G | | | 12 | | | | | | |
| | Dis-azo Yellow | | | | 12 | | 12 | | | |
| Modified polymer | A | 2 | | | | | | | | |
| | B | | 3 | | | | | | | |
| | C | | | 5 | | | | | | |
| | D | | | | 6 | | | | | |
| | E | | | | | 3 | | | | |
| | F | | | | | | 6 | | | |
| | G(1) | | | | | | | | 3 | |
| | H(2) | | | | | | | | | 3 |
| Properties of particles | Particle diameter (μm) | 8.6 | 8.1 | 8.5 | 8.9 | 8.3 | 9.4 | 9.3 | 8.8 | 9.5 |
| | Dispersion state | ⊚ | ⊚ | ○ | ⊚ | ○ | ⊚ | X | X | Δ |

Notes
(1) and (2) are the same as in Table 3.

EXAMPLE 13

70 parts of styrene, 30 parts of butyl methacrylate, 4 parts of the modified polymer B obtained in Synthetic Example 1, 8 parts of carbon black [Printex 150T (trade name)], 0.5 part of a Cr type dye [Bontron S-34 (trade name)] and 2 parts of 2,2'-azobis(2,4-dimethylvaleronitrile) were subjected to ball mill dispersion at room temperature to obtain a uniform mixture.

The mixture was added to 350 parts of pure water in which 5 parts of calcium phosphate was finely dispersed, to obtain an aqueous dispersion.

The aqueous dispersion was subjected to high-shear stirring using a rotor stator type homomixer, at a pH of at least 9, to finely disperse the above-mentioned mixture in water.

This aqueous monomer dispersion was placed in a reactor equipped with an agitating element and subjected to polymerization at 65° C. for 4 hours with stirring.

The thus obtained polymers dispersion was thoroughly acid-washed and water-washed, after which separation and drying were conducted to obtained a toner material. The material had a volume-average particle diameter of 12.0 μm and a number-average particle diameter of 10.8 μm and had a very narrow particle diameter distribution.

100 parts of the toner material was mixed with 0.3 part of hydrophobic silica to obtain a toner.

The cross-sections of toner particles were observed using an electron microscope, which indicated that carbon black was uniformly dispersed inside each particle. The toner showed an electric resistivity of 11.0 log Ωcm when measured under the conditions of 30° C. and 1 kHz. In the toner, the charge acceptance was −20 μc/q; the reversely charged toner portion was substantially zero; thus, the static charge distribution was very narrow.

The toner was subjected to a continuous (20,000 sheets) copying test using a commercial copying machine (Leodry 8411 manufactured by TOSHIBA CORP.). The transfer efficiency was a high as 92%; the image density was 1.38; and there was no decrease in image density and the image was clear and free from fogging, non-uniformity and dirt, even after 20,000 sheets.

EXAMPLE 14

80 parts of styrene, 20 parts of butyl acrylate, 2 parts of the modified polymer E obtained in Synthesis Example 2, 5 parts of a color pigment [Carmine Blue GNR-O (trade name)], 1 part of a dye [Bontron E-87 (trade name)] and 2 parts of 2,2'-azobis(2,4-dimethylvaleronitrile) were subjected to ball mill dispersion at room temperature to obtain a uniform mixture.

Then, a toner was prepared in the same manner as in Example 13.

In the toner, the pigment was uniformly dispersed inside each particle and the electric resistivity was 11.3 log Ω·cm. The charge acceptance was −19 μc/q; the reversely charged toner portion was substantially zero; thus, the charge distribution was very narrow.

The toner was subjected to a continuous (20,000 sheets) copying test using a commercial copying machine under the circumstances of normal temperature and normal humidity (23° C. and 55% RH) and high temperature and high humidity (30° C. and 80% RH). The image densities were 1.20 and 1.25, respectively; and, even after 20,000 sheets, there was no decrease in image density the the image was clear and free from fogging, non-uniformity and dirt.

EXAMPLE 15

40 parts of styrene, 30 parts of butyl methacrylate, 10 parts of the modified polymer B, 100 parts of a magnetic powder [BL 200 (trade name) manufactured by Titan Kogyo], 0.5 part of a dye [Bontron S-34 (trade name)] and 2 parts of 2,2'-azobis(2,4-dimethylvaleronitrile) were subjected to ball mill dispersion at room temperature to obtain a uniform mixture.

Then, polymerization, washing and drying steps were conducted in the same manner as in Example 1, to prepared a toner.

In the toner, the magnetic powder was uniformly dispersed inside each particle and the electric resistivity was 10.9 log Ω·cm.

The toner was subjected to a continuous (20,000 sheets) copying test using a commercial copying machine. The image density was 1.33; and, even after 20,000 sheets, there was no decrease in image density the image was clear and free from fogging, non-uniformity and dirt.

EXAMPLE 16

In a methyl ethyl ketone of an amount shown in Table 5 were dissolved binders, i.e., a vinyl chloride-vinyl acetate copolymer (ZEON 400X-100A manufactured by Nippon Zeon Co., Ltd.), a polyurethane (Nippollan 2301 manufactured by NIPPON POLYURETHANE INDUSTRY) and a polyisocyanate (CRONATE L manufactured by NIPPON POLYURE- THANE INDUSTRY) in amount shown in Table 5. Thereto were added the colored spherical fine particles of Example 1, 2, 4 or 7 or Comparative Example 3 in an amount shown in Table 5. The mixture was thoroughly stirred and dispersed to prepare compositions for coating.

Each composition was coated on a polyethylene terephthalate (PET) film using an air doctor coater so that the coating film thickness after drying became 2 $\mu$, The coated PET film was dried at room temperature and subjected to a test for coating film properties. The results are shown in Table 3.

Incidentally, antistatic property was determined by allowing the coating PET film to stand for 24 hours in an atmosphere of 25° C. and 60% RH and then measuring the electrical resistance of the coating film surface (antistatic property was expressed by this electric resistivity). Abrasion resistance was evaluated using a Gakushin type colorfastness tester, in accordance with JIS L 1084. The condition of abrasion after 100 times of two-way (going and returning) movement was visually evaluated and expressed by ○ when no abrasion was observed and X when abrasion was observed.

TABLE 5

| Compounding and evaluation | Composition No. | | | | | |
|---|---|---|---|---|---|---|
| | This invention | | | | Comparison | |
| | 1 | 2 | 3 | 4 | 5 | 6 |
| Colored spherical fine particles (parts) | Example 1<br>60 | Example 2<br>60 | Example 3<br>60 | Example 4<br>60 | — | Comparative Example 3<br>60 |
| Carbon black (parts) | — | — | — | — | 30 | — |
| Zeon 400X-110A (parts) | 17 | 17 | 17 | 17 | 30 | 17 |
| Nippollar 2301 (parts) | 9 | 9 | 9 | 9 | 15 | 9 |
| Coronate L (parts) | 14 | 14 | 14 | 14 | 25 | 14 |
| MEK (parts) | 300 | 300 | 300 | 300 | 300 | 300 |
| Film properties | | | | | | |
| Antistatic property (cm) | $0.8 \times 10^4$ | $1.4 \times 10^4$ | — | — | $9.5 \times 10^4$ | $4.5 \times 10^5$ |
| Abrasion resistance | ○ | ○ | ○ | ○ | X | X |

EXAMPLE 17

In a vessel were thoroughly stirred, at room temperature, 20 parts of the colored spherical fine particles of Example 1 or 2 or Comparative Example 3, 10 parts of a binder, i.e., a polyester type polyurethane (produced from adipic acid/1,6-hexanediol/diphenylmethane-4,4'-diisocyanate and having a weight-average molecular weight of 40,000 as measured by GPC) and 70 parts of a solvent (toluene/MEK/cyclohanone=3/3/1), to prepare back coat agents for magnetic recording tape. Each back coat agent was coated on the back side of a video tape having no back coat layer, so that the coating film thickness after drying became 5 $\mu$. Each coated tape was dried at room temperature.

Each of the resulting video tapes was evaluated for abrasion resistance of back coat layer. That is, each video tape was allowed to travel 500 times, after which the damage of back coat layer and the staining of guide pine in travelling path were visually observed and evaluated. The results are shown in Table 6.

TABLE 6

| Compounding and evaluation | Composition No. | | |
|---|---|---|---|
| | This invention | | Comparison |
| | 7 | 8 | 9 |
| Colored spherical fine particles | Example 1 | Example 2 | Comparative Example 3 |
| Evaluation results | | | |
| Damage | very little | very little | Much |
| Staining of guide pin | None | None | Much |
| Peeling of back coat | None | None | Much |

EXAMPLE 18

Each of the back coat agents of Example 17 was coated on the back side of a heat-sensitive transfer ink ribbon having no back coat layer, so that the coated film thickness after drying became 10 $\mu$. Then, each coated ribbon was dried. The resulting ink ribbon was subjected to an actual performance test. As a result, the slipperiness and antistatic property were far superior to commercial heat-sensitive transfer ink ribbons.

EXAMPLE 19

50 parts of the colored spherical fine particles of Examples 1, 2, 4, 6 or 7 or Comparative Example 7 and 50 parts of carnauba wax were thoroughly mixed at 96° C. for 30 minutes to prepare heat-sensitive transfer inks. Each of the inks was coated on a glass plate in a think film, and the dispersion state of colored spherical fine particles was observed using an optical microscope. As a result, the inks using the colored spherical fine particles of each Example (this invention) showed very good dispersion state while the ink using the colored spherical fine particles of Comparative Example showed very poor dispersion state.

Then, each ink was coated on a biaxially stretched polyethylene terephthalate film using a wire bar, so that the coating film thickness after drying became 8 $\mu$, whereby heat-sensitive transfer ink ribbons were prepared. Each ink ribbon was mounted on a thermal printer, and printing was conducted on an ordinary paper. The quality of image was evaluated in resolution and non-uniformity. The inks each using the colored spherical fine particles of the present invention gave very good results while the ink as comparison was insufficient in both resolution and non-uniformity.

EXAMPLE 20

Offset printing inks were prepared using each of the colored spherical fine particles used in Example 19. 45 parts of colored spherical fine particles and 50 parts of a varnish for offset printing ink were kneaded using three rolls. Very uniform dispersions were obtained when the fine particles of the present invention were used. 95 parts of each resulting dispersion, 0.2 part of a 5% cobalt dryer, 1.0 part of a 8% manganese dryer and 3.8 parts of an ink solvent (100 parts in total) were kneaded in the same manner as above, to prepare offset printing inks. Using these inks, printing was conducted using an offset printer. Each of the inks using the colored spherical fine particles of the present invention gave a printed matter with an Indian ink shade of very high blackness. The inks also had excellent fluidity and excellent storage stability. The ink as comparison was insufficient in any of blackness, fluidity and storage stability.

I claim:

1. Colored spherical fine particles which are obtained by dissolving or dispersing a modified polymer, together with a coloring agent, in a polymerizable monomer, and polymerizing the polymerizable monomer, wherein the modified polymer is obtained by reacting an unsaturated polymer with an organic compound containing an aldehyde group and a carboxyl group in the presence of a Lewis acid or a protonic acid catalyst.

2. The colored spherical fine particles of claim 1, wherein the unsaturated polymer is a polymer having carbon-carbon double bonds.

3. The colored spherical fine particles of claim 1, wherein the organic compound is an aldehyde-carboxylic acid of up to 20 carbon atoms having at least one aldehyde group and at least one carboxyl group in the molecule.

4. A process for producing colored spherical fine particles, which comprises dissolving or dispersing a modified polymer, together with a coloring agent, in a polymerizable monomer, and polymerizing the polymerizable monomer, wherein said modified polymer is obtained by reacting an unsaturated polymer with an organic compound containing an aldehyde group and a carboxyl group in the presence of a Lewis acid or a protonic acid catalyst.

5. A toner for electrostatic image development, comprising a toner additive and colored spherical fine particles, which are obtained by dissolving or dispersing a modified polymer, together with a coloring agent, in a polymerizable monomer, and polymerizing the polymerizable monomer, wherein the modified polymer is obtained by reacting an unsaturated polymer with an organic compound containing an aldehyde group and a carboxyl group in the presence of a Lewis acid or a protonic acid catalyst.

6. A dispersion composition containing colored spherical fine particles, which comprises colored spherical fine particles, which are obtained by dissolving or dispersing a modified polymer, together with a coloring agent, in a polymerizable monomer, and polymerizing the polymerizable monomer, wherein said modified polymer is obtained by reacting an unsaturated polymer with an organic compound containing an aldehyde group and a carboxyl group in the presence of a Lewis acid or a protonic acid catalyst, dispersed in a dispersion medium.

7. A covering material which is obtained by using the dispersion composition set forth in claim 6.

8. A back coating agent for magnetic recording medium which is obtained by using the dispersion composition set forth in claim 6.

9. A back coating agent for heat-sensitive transfer ink ribbon, which is obtained by using the dispersion composition set forth in claim 6.

10. A heat-sensitive transfer ink ribbon which is obtained by using the dispersion composition set forth in claim 6.

11. A printing ink which is obtained by using the dispersion composition set forth in claim 6.

12. The colored spherical fine particles of claim 1 which have a size of 0.1-100 $\mu$m.

13. The colored spherical fine particles of claim 1 which have a size of 2 to 50 $\mu$m.

14. The process of claim 4 wherein the colored spherical fine particles have a size of 0.1 to 100 $\mu$m.

15. The process of claim 4 wherein the colored spherical fine particles have a size of 2 to 50 $\mu$m.

16. The toner of claim 5 wherein the toner has a particle size of 2 to 50 $\mu$m and comprises a magnetic powder.

* * * * *